(12) United States Patent
Dow

(10) Patent No.: US 6,910,146 B2
(45) Date of Patent: Jun. 21, 2005

(54) METHOD AND APPARATUS FOR IMPROVING TIMING MARGIN IN AN INTEGRATED CIRCUIT AS DETERMINED FROM RECORDED PASS/FAIL INDICATIONS FOR RELATIVE PHASE SETTINGS

(75) Inventor: Keith E. Dow, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 700 days.

(21) Appl. No.: 09/992,145

(22) Filed: Nov. 5, 2001

(65) Prior Publication Data

US 2002/0083359 A1 Jun. 27, 2002

Related U.S. Application Data

(63) Continuation-in-part of application No. 09/476,976, filed on Dec. 31, 1999, now Pat. No. 6,647,507.

(51) Int. Cl.$^7$ .......................... G06F 1/04; G01R 31/28; G01R 31/26
(52) U.S. Cl. ................ 713/500; 714/724; 324/765
(58) Field of Search ........................ 713/500, 503; 714/36, 744, 724, 731, 733, 742; 702/117, 118, 125; 324/765; 257/48

(56) References Cited

U.S. PATENT DOCUMENTS

| | | |
|---|---|---|
| 4,162,536 A | 7/1979 | Morley |
| 4,648,064 A | 3/1987 | Morley |
| 4,694,472 A | 9/1987 | Torok et al. |
| 5,058,132 A | 10/1991 | Li |
| 5,357,195 A | 10/1994 | Gasbarro et al. |
| 5,857,095 A | 1/1999 | Jeddeloh et al. |
| 5,945,862 A | 8/1999 | Donnelly et al. |
| 5,987,576 A | 11/1999 | Johnson et al. |
| 6,049,846 A | 4/2000 | Farmwald et al. |
| 6,115,318 A | 9/2000 | Keeth |
| 6,324,485 B1 | 11/2001 | Ellis |

OTHER PUBLICATIONS

*Direct DRAM* ™ *64/75–MBIT (256KX16/18X16D)*, Preliminary Information, Document DL0035 Version 1.0, Frederick A. Ware, RAMBUS Inc., MAy 1999, pp. 1–62.

*Primary Examiner*—Thomas Lee
*Assistant Examiner*—Suresh Suryawanshi
(74) *Attorney, Agent, or Firm*—Blakely, Sokoloff, Taylor & Zafman LLP (57) ABSTRACT

Under the control of a processor executing a program, the timing margin of an electronic system can be improved by a series of operations that set the relative phase of receive and distributed clock signals from a number of given values, a relative phase of transmit and distributed clock signals from a number of given values, instruct an integrated circuit (IC) die to drive a sequence of outgoing data symbols and receive a sequence of incoming data symbols at those relative phase settings, and compares the outgoing symbols to the incoming symbols. A result of the comparison is recorded. The operations are repeated for other combinations of the discrete transmit and receive phase values. The relative phases are then set to a pair of values taken from the discrete transmit and receive phase values, which are closest to yielding a balanced timing margin as determined from the results of the comparisons.

21 Claims, 10 Drawing Sheets

METHOD AND APPARATUS FOR IMPROVING TIMING MARGIN IN AN INTEGRATED CIRCUIT AS DETERMINED FROM RECORDED PASS/FAIL INDICATIONS FOR RELATIVE PHASE SETTINGS

This is a continuation-in-part application of Ser. No. 09/476,976 filed on Dec. 31, 1999 now U.S. Pat. No. 6,647,507.

BACKGROUND

This invention is in general related to chip-to-chip digital communications and more particularly to clock-based chip-to-chip communications.

Processor clock speeds in electronic systems are continuing to increase and show no signs of reaching a plateau. As a result, the bit rate in communications between different integrated circuit (i.e., IC) dies, also known as chips, in the system are forced to increase to maintain an optimum performance level in the system. One factor that limits the performance of a high speed system is timing variation, that is a difference in the timing of the occurrence of a particular signal transition, between the actual system and what was expected or designed for the system. Timing variations may be caused by a combination of one or more factors. These factors include those that are related to the manufacture of the system, such as variations in on-die device parameters, the geometry of printed wiring board (i.e., PWB) traces, and IC package transmission line length and impedance. Fatal system errors are more likely when timing variations exceed the levels which the system has been designed to tolerate. These levels are referred to here as 'timing margin'.

As bit rates increase, timing margin, in terms of a maximum departure from a nominal timing or phase relationship between two signals, decreases. Any departure from a nominal phase relationship between a received data signal and a distributed clock signal of the system is referred to as clock-data 'skew'. One way to improve the tolerance of a high bit rate system to such skew is to use source synchronous transmissions. In such a transmission, the transmitter IC die may synchronize each consecutive data symbol in a driven data signal with a corresponding, separate transition in a distributed clock signal. The data signal and the distributed clock signal are propagated from the transmitter IC die to other IC dies (that is receiving IC dies). To help reduce skew between the data and the distributed clock signals at the receiving end, the transmission lines that carry the data and clock signals between the transmitter and the receiver IC dies are designed to be 'matched'. However, as bit rates continue to increase beyond several hundred MHz, the maximum skew that is tolerable by the logic function circuitry in a receiving IC die may be exceeded, even by such a source synchronous transmission. In other words, even though an attempt has been made to match the two transmission lines and transmit the data and clock information simultaneously at the design stage, it is possible that manufacturing process variations and/or operating factors (such as temperature and power supply variations) cause the, for instance, data signal to take much longer to reach the receiver than the distributed clock signal, such that the maximum, expected skew is exceeded.

When the system is initially designed, a nominal timing margin may be provided. For example, the nominal timing margin in a conventional, main memory (in this case, dynamic random access memory or DRAM) subsystem has been +/−125 picoseconds about a nominal phase relationship between data and clock signals. Thus, up to 125 picoseconds of skew can be tolerated by the logic functional circuitry, in either direction about an expected 'zero picosecond' skew. However, when the system has been manufactured and placed in operation, it is likely that the initial skew is not zero, but rather some significant fraction of the maximum +/−125 picoseconds. This means that the available timing margin of the actual, manufactured system, during normal operation, has been reduced and is not balanced in both directions.

A limited solution to forcing the actual electronic system to operate close to the zero picosecond (balanced) setting is to adjust the trace length of the data signal transmission line and/or the clock signal transmission line so that the initial skew is set to zero. Such a technique, however, requires the physical fine tuning of PWB traces and thus may increase the cost of manufacture. In addition, once the system has been manufactured and the trace lengths are fixed, it is still possible that the initial skew will change with operating parameters, thereby once again causing an imbalance and reduction in the available timing margin.

BRIEF DESCRIPTION OF THE DRAWINGS

The invention is illustrated by way of example and not by way of limitation in the figures of the accompanying drawings in which like references indicate similar elements. It should be noted that references to "an" embodiment in this disclosure are not necessarily to the same embodiment, and they mean at least one.

DETAILED DESCRIPTION

Figure 1:
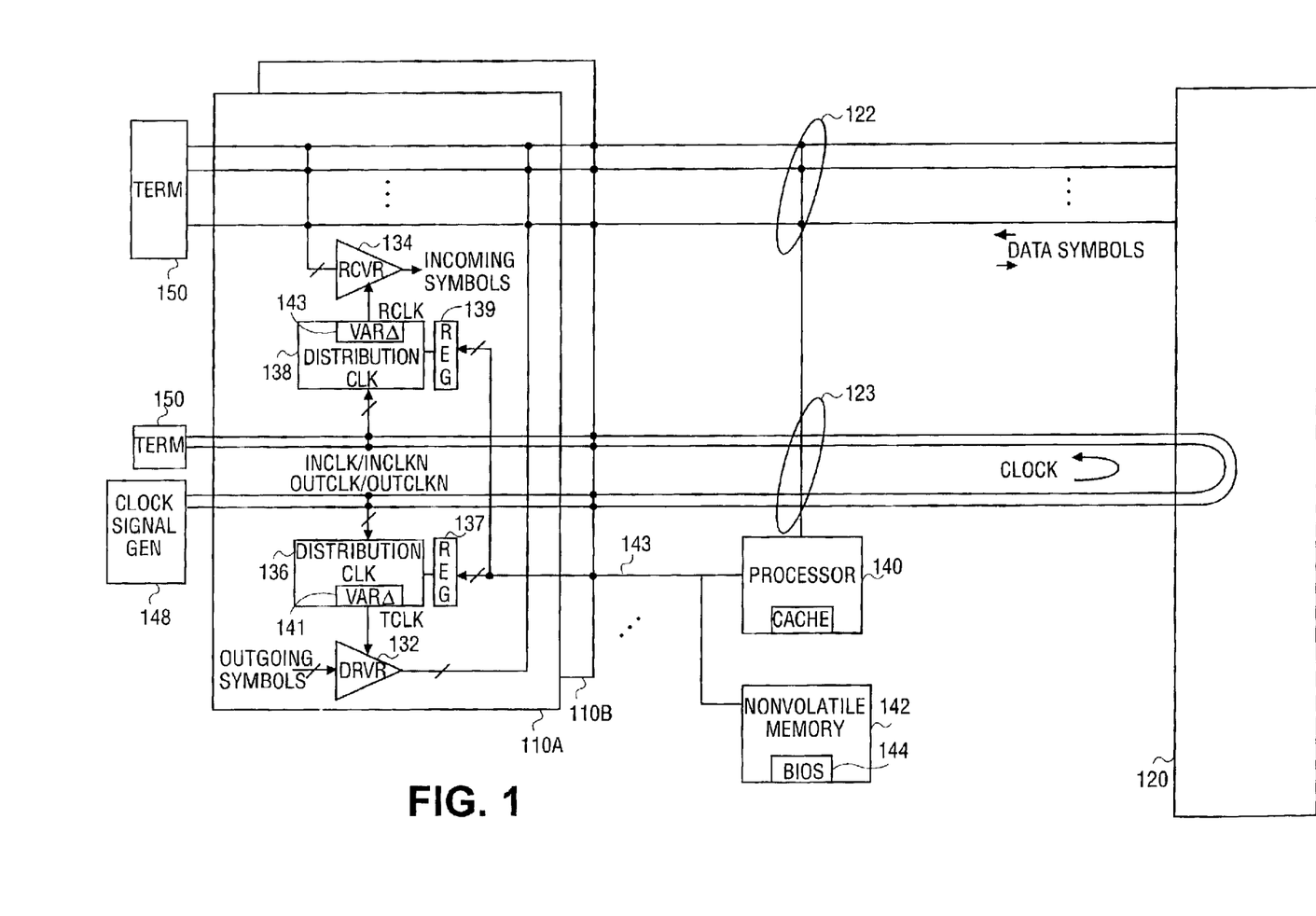
FIG. 1 shows a block diagram of an electronic system according to an embodiment of the invention in which transmit and receive timing is adjusted in the same integrated circuit die.

A method and apparatus for increasing, and, in particular, balancing, the timing margin in chip-to-chip communications, under the control of processor executable instructions, is described. Referring to FIG. 1, a block diagram of an electronic system configured according to an embodiment of the invention is shown. A number of first IC dies 110a, 110b, . . . are communicatively coupled to a second IC die 120 via one or more data transmission lines 122 and one or more clock transmission lines 123. The data transmission lines 122 are used to transmit and receive data symbols which may represent addresses, contents of storage locations, or commands. The clock transmission lines 123 serve to propagate a distributed clock signal that is used to synchronize the transmission and receipt of the data symbols by the respective IC dies. In this particular embodiment, the distributed clock signal is differential and travels on a pair of parallel traces formed in a printed wiring board (i.e., PWB) on which the first and second IC dies are installed. As an alternative, the system may use a single trace for propagating a single ended distributed clock signal, which may be permissible for low speed applications. The data and clock transmission lines 122, 123 form a parallel bus. This bus may be of the point to point variety or it may be of the multi drop variety as in a conventional memory bus having slots in which the memory modules are inserted.

The first IC die 110 is to drive one or more of the data transmission lines 122 with a sequence of outgoing data symbols according to a transmit clock signal Tclk. A driver 132 is used for this purpose, where the driver converts between on-die logic signaling and signaling levels that are needed on the data transmission lines 122. The driver 132 validates or "launches" each data symbol according to a predefined transition in the Tclk signal. For example, each outgoing symbol may be driven directly in response to a rising edge of a digital, Tclk signal.

As a receiving IC die, the first IC die 110 is to repeatedly sample a transmission line signal from one of the data transmission lines 122, to obtain a sequence of incoming data symbols according to a receive clock (i.e., Rclk) signal. As shown in FIG. 1, a receiver circuit 134 translates between the signaling levels on the transmission lines 122 and those of the on chip logic functional units (not shown). In addition, the receiver circuit 134 validates each incoming symbol by sampling a signal level in the transmission lines 122. This may be achieved by, for instance, sampling and holding a voltage level of an analog transmission line signal directly in response to and immediately following a predefined rising or falling edge of a digital Rclk signal, and then comparing the held voltage level to a reference level to determine a logic state of the voltage level. As an alternative, the receiver circuit 134 may sample not the analog transmission line signal, but rather a digital output of a comparator, where the comparator translates an instantaneous analog transmission line signal level into a logic '0' or '1' state. Other receiver circuit schemes may be used to obtain a sequence of incoming symbols according to the Rclk signal.

Although in the particular embodiment shown in FIG. 1 the communication between the first IC die 110 and the second IC die 120 is bidirectional in that the same transmission line 122 is used to transfer data symbols in both directions, the techniques for improving timing margin also apply to unidirectional schemes as well where some of the transmission lines 122 are used to transfer data in one direction only while others are used to transfer data in the opposite direction.

The first IC die 110 also includes a driver timing circuitry 136 to derive the Tclk signal from the distributed clock signal. According to an embodiment, the driver timing circuitry 136 is designed so that each of the outgoing data symbols is driven into the transmission lines 122 by the driver 132, according to a transmit delay immediately following each of a number of separate transitions of the distributed clock signal, respectively. In other words, the Tclk signal is synchronized to the distributed clock signal received at the input of the driver timing circuitry 136. Similarly, at the receiving end, the first IC die 110 includes receiver timing circuitry 138 to derive the Rclk signal from the distributed clock signal, so that each of the incoming data symbols is obtained by sampling according to a receive delay immediately following each of a number of separate transitions of the distributed clock signal, respectively. Thus, the Rclk signal is synchronized to the distributed clock signal at the input of the receiver timing circuitry 138.

According to an embodiment of an apparatus for increasing, and, in particular, balancing, the timing margin in chip-to-chip communications, the first IC die 110 further includes registers 137 and 139 that are coupled to store values to be received by an external input of the first IC die 110. In addition, variable delay elements 141 and 143 are coupled to adjust (1) a relative phase of the Tclk and distributed clock signals, and (2) a relative phase of the Rclk and distributed clock signals, respectively, according to the values stored in the registers 137, 139 respectively. The registers 137 and 139 may be written to in response to a processor 140 executing a number of instructions stored in a machine-readable memory such as non-volatile memory 142. These instructions may be part of a basic input/output system (i.e., BIOS) 144 which is part of the system software of the electronic system. The instructions, once executed, control a timing margin of the system particularly involving chip-to-chip communications between the first and second IC dies 110, 120. Access to the registers 137, 139 may be via a separate bus 143 between the processor 140 and the IC dies 110. Before describing processes for improving the timing margin, FIGS. 2 and 3 are used to provide exemplary timing diagrams of a nominal, zero skew relationship between driven and received data signals and the distributed clock signals, and the effect of driving or receiving data symbols according to the Tclk and Rclk signals.

Figure 2:
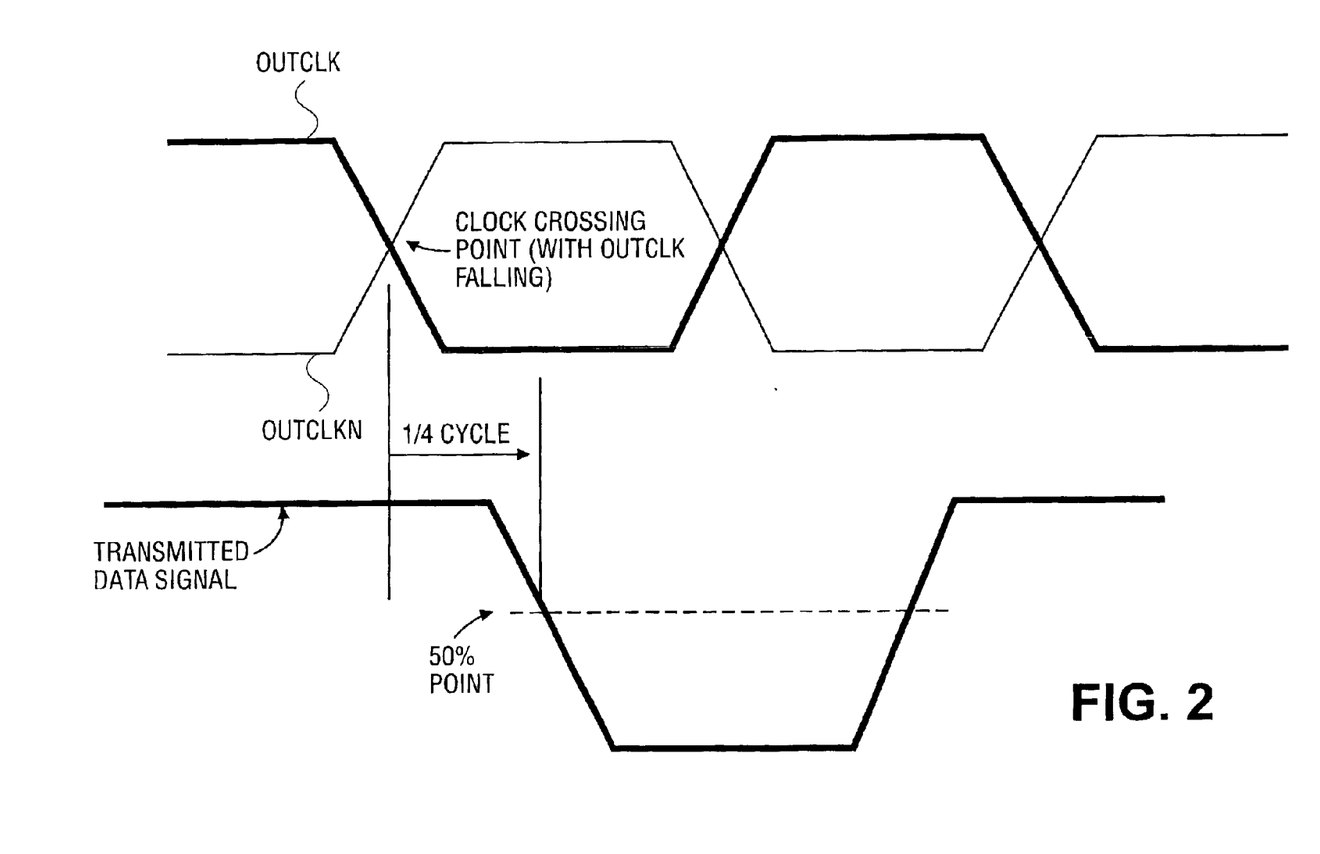
FIG. 2 shows an exemplary transmit timing diagram.
Figure 3:
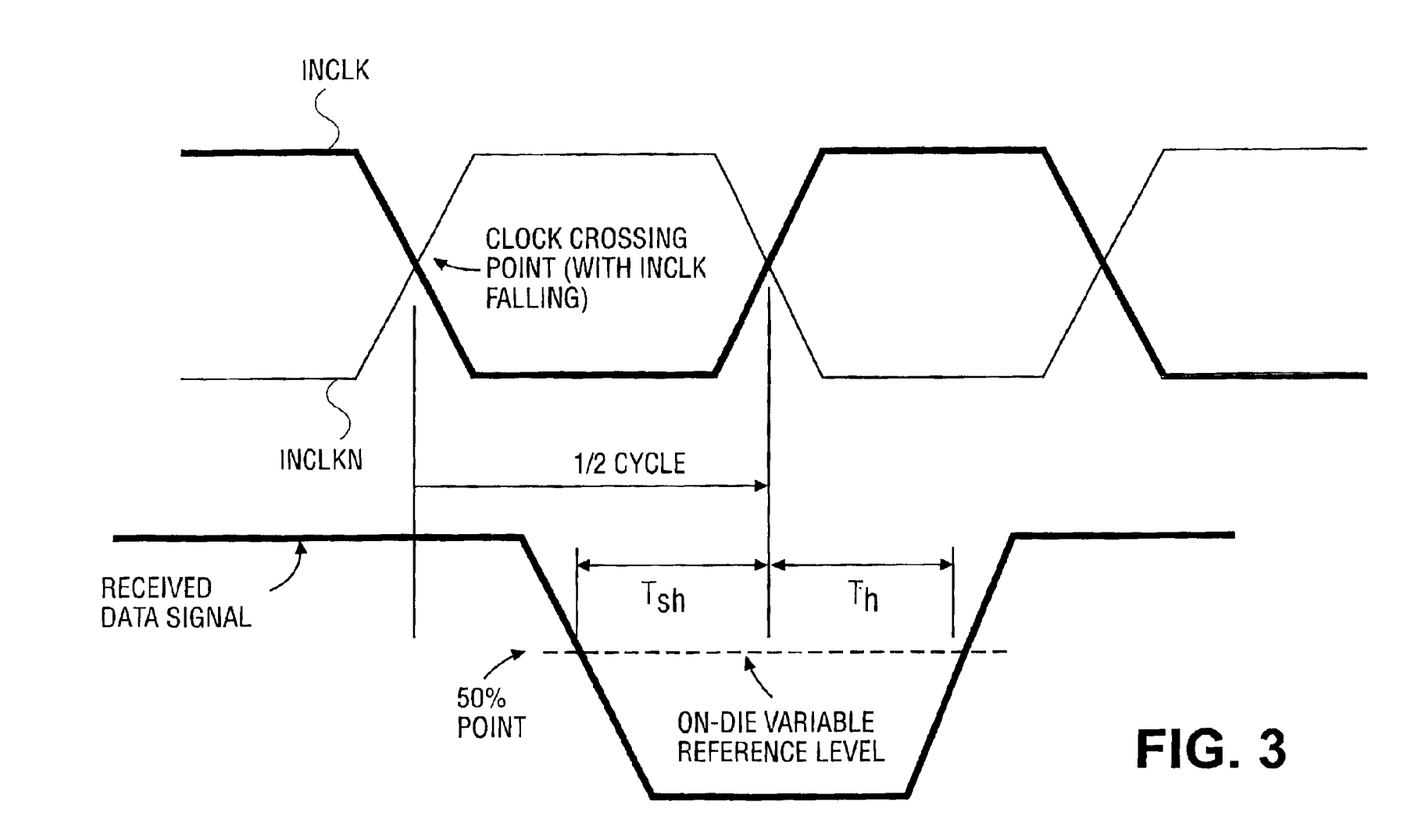
FIG. 3 shows an exemplary receive timing diagram.

Referring first to FIG. 2, an exemplary transmit timing diagram of a data signal and a distributed clock signal is shown. The data signal has been driven on the transmission lines 122 by the driver 132 (see FIG. 1) according to a Tclk signal (not explicitly shown) derived from a distributed clock signal. In this embodiment, the distributed clock signal is a differential signal of components OUTCLK/OUTCLKN as shown, which are provided to the driver timing circuitry 136 from an upstream location of a pair of looped PWB traces (see FIG. 1). It will be recognized by those of ordinary skill in the art that other schemes for obtaining the distributed clock signal may alternatively be used, and examples of such alternatives will be given further below. Referring to FIG. 2, it can be seen that in this embodiment the nominal transmit delay is one of ¼ cycle and ¾ cycle of the distributed clock signal OUTCLK/OUTCLKN. In other words, the data is designed to be launched ¼ or ¾ cycle after a clock crossing point as shown. This means that the driver timing circuitry is designed to generate the Tclk signal such that, in this embodiment, the 50% level of the voltage of the data signal occurs at ¼ cycle or ¾ cycle after the clock crossing point, where it is understood that the clock crossing point refers to the point in time at which the differential signal OUTCLK/OUTCLKN exhibits zero voltage.

Note that in the example above, the data signal is a binary waveform in that it can take on only one of two stable levels, a low voltage level and a high voltage level. In other embodiments, the data signal may be allowed more than two stable voltage levels if the chip-to-chip communications support multiple levels so that more than two different symbols can be transmitted and received. Thus, for the data signal which is a binary waveform, only two different symbols are defined, whereas in 4 pulse amplitude modulation (i.e., 4PAM) four different symbols, corresponding to four different stable, voltage levels in the data signal, are possible. In such a multilevel embodiment, a transition point between different stable levels may be used to define the transmit delay, similar to what is shown in FIG. 2 for the binary waveform.

The data signal (containing outgoing data symbols) is to be driven into the data transmission lines 122 (see FIG. 1) and accompanied by the distributed clock signal on the clock transmission lines 123 as both data and clock signals travel from the first IC die 110 to the second IC die 120. Now assume that a sequence of incoming data symbols have been launched in the same manner, from the second IC die 120. FIG. 3 shows exemplary receiver timing that can be instituted at the first IC die 110 to properly receive these incoming symbols from the data transmission lines 122. In this instance, the distributed clock signal is a differential INCLK/INCLKN signal that, in the embodiment of FIG. 1, is provided to receiver timing circuitry 134 from a downstream location of the pair of traces that form the clock transmission lines 123. The nominal receive delay in this embodiment is one of zero cycle and ½ cycle of the distributed clock signal. Thus, if the incoming data symbols had been launched according to the timing in FIG. 2, then the data symbols should be sampled at zero cycle or ½ cycle immediately after the clock crossing point with INCLK falling, as in FIG. 3.

Continuing to refer to FIG. 3, the variable $T_{sh}$ is referred to as the set up time, while $T_h$ is known as the hold time. The set up time $T_{sh}$ is the interval of time prior to a clock crossing point when the data signal makes a transition. The hold time $T_h$ is the time interval after the clock crossing point when the data signal makes a transition. The sum of $T_{sh}$ and $T_h$ defines the window during which the data signal is sampled, where in this embodiment the sample point is nominally set to be ½ cycle after the clock crossing point with INCLK falling. According to certain embodiments, the $T_{sh}$ and $T_h$ time intervals should be at least as long as those specified for a D-type flip flop circuit whose D input is to receive the data signal and whose clock input is to receive the Rclk signal, so that the data signal is properly sampled at the output of the flip flop in response to a rising or falling edge of the digital Rclk signal. In such an embodiment, the $T_{sh}$ and $T_h$ intervals define the timing margin for properly sampling the data signal relative to a rising or falling edge of the Rclk signal.

Referring back to FIG. 2, it can be seen that delaying or advancing the launching of the data signal about its nominal timing of ¼ or ¾ cycle leads to shortening $T_{sh}$ (and at the same time lengthening $T_h$) and lengthening $T_{sh}$ (and at the same time shortening $T_h$), respectively, at the receiving end as seen in FIG. 3. This adjustment in the transmit timing may be achieved by the circuitry shown in FIG. 1 and in particular by writing the desired digital value into the register 137 for either delaying or advancing Tclk.

Similar to what has been described in the previous paragraph, a balance between $T_{sh}$ and $T_h$ may be obtained entirely at the receiving end by advancing or delaying the Rclk signal appropriately, by setting the appropriate digital value in the register 139 (see FIG. 1). An embodiment of a process for improving the timing margin in a manufactured system by achieving such a balance is now described in connection with FIG. 4.

Figure 4:
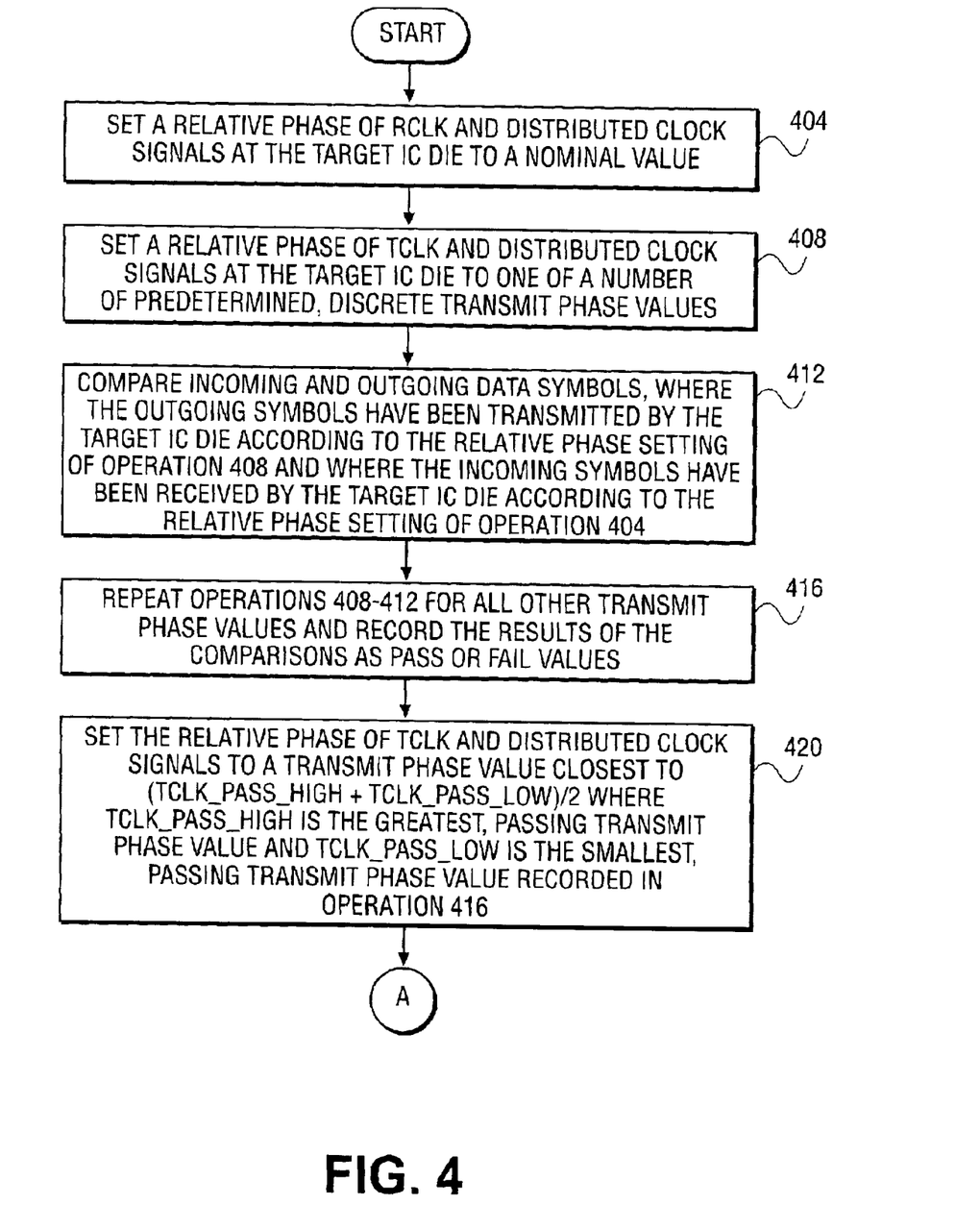
FIG. 4 depicts a flow diagram of an embodiment of a process for improving timing margin in an electronic system.
Figure 5:
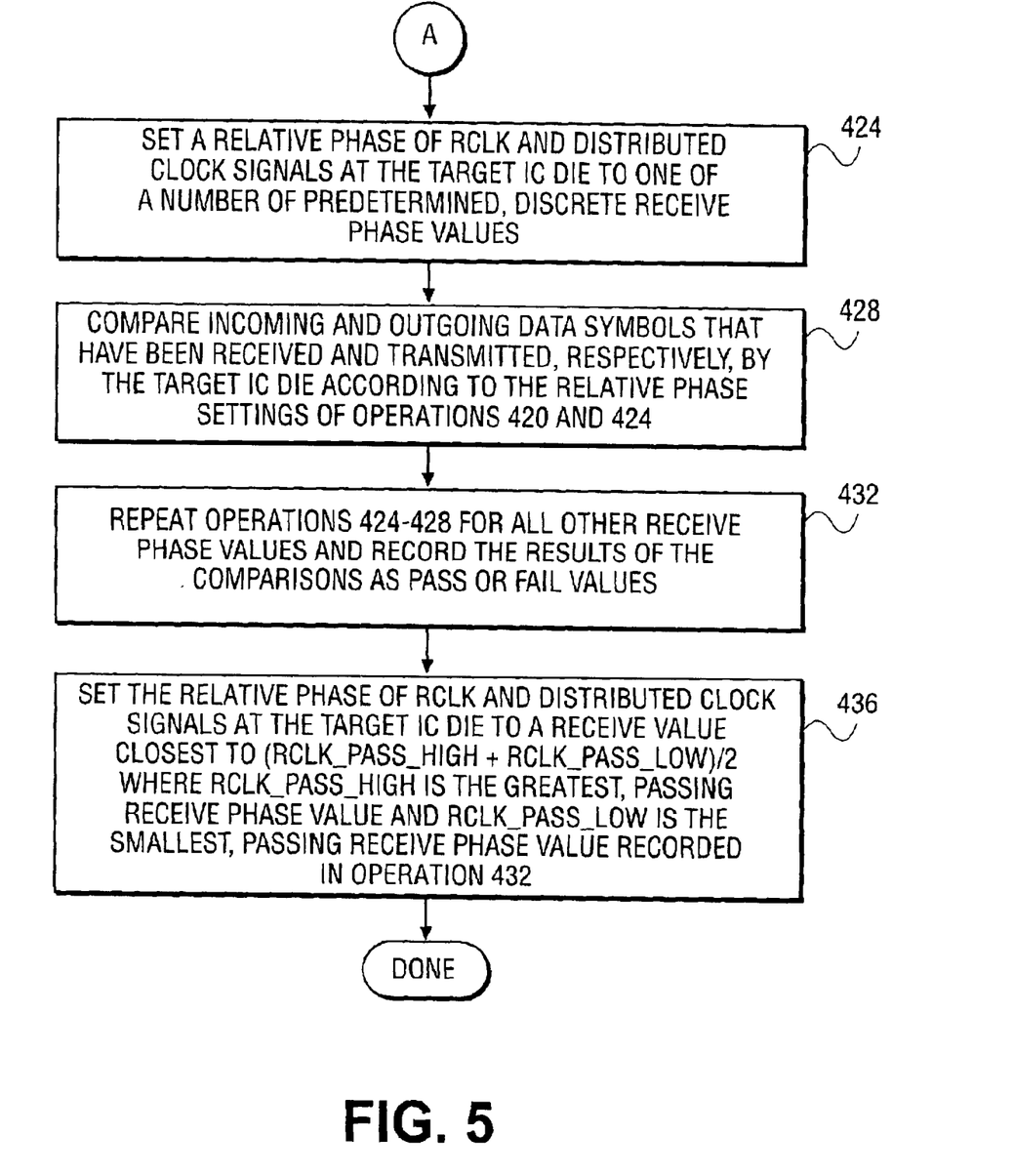
FIG. 5 shows a second part of an embodiment of the process for improving the timing margin.

FIG. 4 shows a flow diagram of a process for improving a timing margin in a given IC die that is part of an operating electronic system. The process attempts to determine the optimum phase relationships between Rclk and the distributed clock signal and between Tclk and the distributed clock signal in the same IC die, to minimize the clock-data skew. In other words, the process attempts to find an adjustment by delaying or advancing Tclk and Rclk, such that the timing margin is balanced, i.e. the launching and receiving of data occurs at the center of a permissible time window, rather than skewed towards one end or the other. In the embodiments of FIGS. 4 and 5, the procedure is divided into two parts, where the first part (FIG. 4) involves making adjustments to the phase of Tclk while keeping the phase of Rclk fixed, and the second part calls for adjusting the phase of Rclk while keeping the phase of Tclk fixed (FIG. 5).

Figure 6:
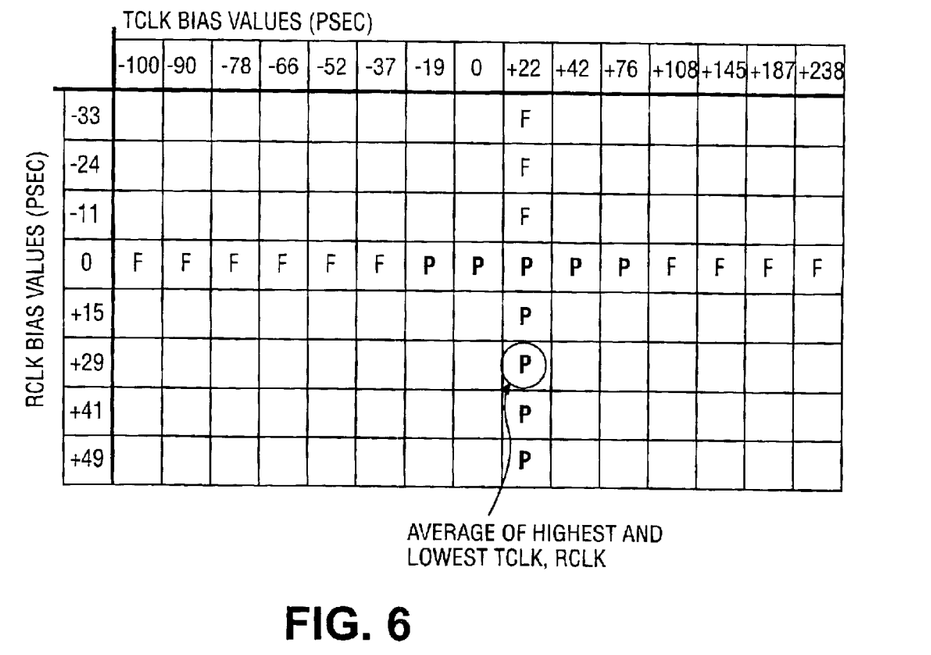
FIG. 6 shows an array of the test results obtained from an embodiment of the process for improving timing margin.

An exemplary set of discrete, Tclk and Rclk bias values are shown in FIG. 6, where the Rclk bias values range from −33 to +49 picoseconds and the Tclk bias values range from −100 to +238 picoseconds. Considering the exemplary timing diagrams of FIGS. 2 and 3, a zero Rclk bias value would represent a phase relationship between Rclk and the distributed clock signal (shown as INCLK/INCLKN) such that Rclk would cause the data signal to be sampled at ½ cycle after the clock crossing point with INCLKN falling (see FIG. 3). As to the zero Tclk bias value, this would correspond to a phase relationship between Tclk and the distributed clock signal (shown as OUTCLK/OUTCLKN) so the data is launched at ¼ cycle after the clock crossing point with INCLK falling. A negative Tclk bias value means that the data symbol is transmitted later than ¼ cycle after the clock crossing point, whereas a positive Tclk bias value means the data is transmitted earlier.

At the receiving end, a negative Rclk bias value means that the data signal is sampled earlier than ½ cycle after the clock crossing point, while a positive Rclk bias value means that the data signal is sampled later. Thus, for instance, to correct for the data symbols propagating faster than the distributed clock signal between the transmitting and receiving IC dies, either or both of the Tclk and Rclk bias values should be negative. On the other hand, to correct for the data being slower than the clock, either or both of the Tclk and Rclk bias values should be positive.

Referring now to FIG. 4, operation begins with setting a relative phase of the Rclk and distributed clock signals at the target IC die, from a number of discrete, receive phase values (e.g. Rclk bias values), to the nominal value, namely zero (operation 404). The relative phase of the Tclk and distributed clock signals at the target IC die are then set to the lowest, in this case most negative, value taken from a number of discrete, transmit phase values (e.g. Tclk bias values) (operation 408). Operation next proceeds with instructing the target IC die to drive a sequence of outgoing data symbols according to Tclk. These outgoing data symbols are then received by the receiving IC die, buffered, and then transmitted back as a sequence of incoming data symbols. The target IC die is to then receive the sequence of incoming data symbols according to Rclk. The driving and receiving operations are to be performed at the relative phase settings of operations 404 and 408. After the incoming signals have been received in this manner by the IC die, they are compared to the outgoing symbols (operation 412). If the incoming and outgoing symbols are equal to each other, then this test of the relative phase settings is deemed to be a "pass" and a pass indication is stored and associated with the relative phase settings of operations 404 and 408.

The above described operations 408–412 are repeated for all possible Tclk bias values, which may result in populating a row of an array, with pass or fail indications as shown in FIG. 6, corresponding to the Rclk bias value of zero picoseconds (operation 416). According to an embodiment of the invention, the process continues with operation 420 in which the relative phase of the Tclk and distributed clock signals are set to a transmit phase value that is closest to the average of the highest and lowest passing transmit phase values that were recorded in operation 416. This operation thus attempts to obtain a balanced timing margin by selecting, in the exemplary embodiment shown in FIG. 6, a Tclk bias value of +22 picoseconds. The process then continues with operations 424-436 shown in FIG. 5.

With Tclk being set to the average passing value as described in the previous paragraph, the process continues with operation 424 in which the relative phase of the Rclk and distributed clock signals at the target IC die are set to, for instance, the lowest of a number of predetermined, discrete receive phase values (e.g. Rclk bias values such as those shown in FIG. 6). The process then continues with running a test of the communication link between the target IC die and a receiving IC die, by sending and receiving outgoing and incoming data symbols, respectively, at the relative phase settings of operations 420 and 424. These incoming and outgoing data symbols are then compared to determine whether the test was passed or failed by those relative phase settings (operation 428). Operations 424 and 428 are then repeated for all other receive phase values, and the results of the comparisons are recorded as pass or fail values which may then populate a column as shown in FIG. 6. Finally, in operation 436, the relative phase of the Rclk and distributed clock signals are set to a receive phase value that is closest to the average passing Rclk bias value as recorded in operation 432. Thus, for the example of FIG. 6, improved timing margin may be expected by setting the Rclk bias to +29 picoseconds and the Tclk bias to +22 picoseconds, where these two values are the average of the highest and lowest passing Rclk and Tclk bias values, respectively. These Rclk, Tclk settings are expected to provide a balanced timing margin in the sense that data will be launched and sampled in the middle of a permissible timing window.

Figure 7:
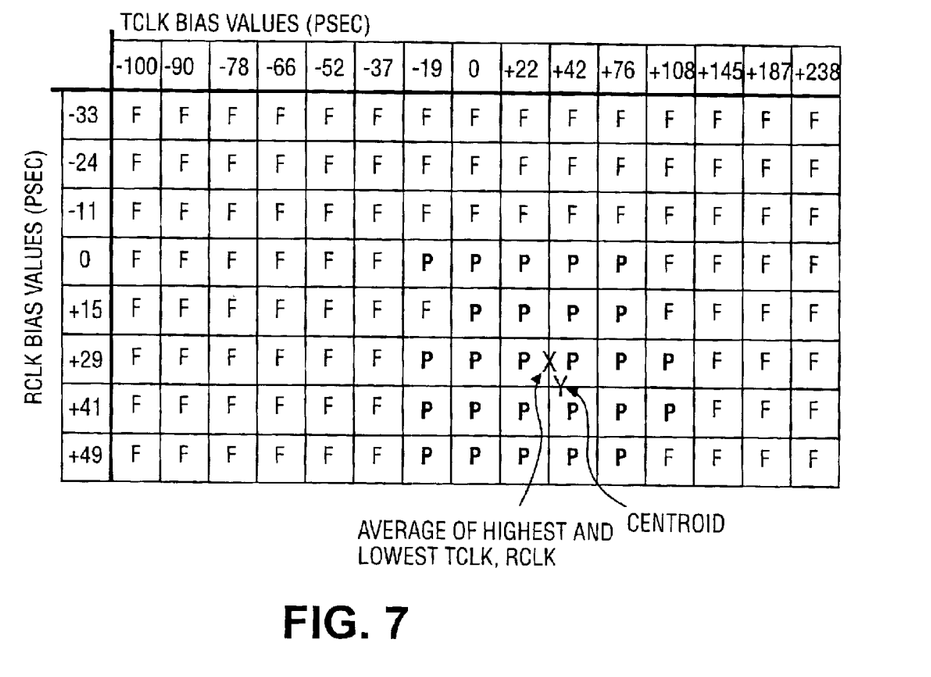
FIG. 7 depicts test results from another embodiment of the process.

The comparison results shown in FIG. 6 formed a single row and a single column in the array of Tclk and Rclk bias values, As an alternative technique, the process for improving timing margin may be configured to test all combinations of transmit and receive values prior to deciding the "optimal" relative phase settings that are closest to yielding a balanced timing margin. The results of such an embodiment are shown in FIG. 7 in which a two-dimensional region of pass values is obtained as a result of testing all combinations of Tclk and Rclk bias values. The same technique for determining the phase value which is closest to yielding a balanced timing margin, as applied to FIG. 6 in operations 420 and 436, may also be applied to the array of FIG. 7. Taking the average of the highest and lowest passing Rclk and Tclk values from FIG. 7 yields a Rclk, Tclk pair located approximately at the point marked 'X' in between the +22 and +42 Tclk bias values, at the +29 Rclk bias value. Thus, in this embodiment, the relative phase values which are closest to yielding the balanced timing margin are +29 picoseconds for the Rclk and either +22 or +42 for the Tclk. Note how this result is slightly different than what was obtained in connection with FIG. 6, namely that the optimal Tclk bias value would be at +22.

Yet another technique for determining the relative phases which are closest to yielding a balanced timing margin is to compute a centroid of the two-dimensional area of passing values shown in FIG. 7. The centroid or "center of gravity" would lie approximately at the point marked 'Y' which is slightly to the right of and below the point marked 'X'. Thus, according to the centroid calculation, the balanced timing margin may be obtained by a bias value that is greater than +22 picoseconds for Tclk and slightly greater than +29 for Rclk. Of course, by selecting a greater number of discrete Tclk and Rclk values, the system will be able to move even closer to yielding the balanced timing margin due to the finer resolution available.

Although a larger number of discrete Rclk and Tclk bias values provides finer resolution to reach the balanced timing margin, a tradeoff is that it will take a longer period of time to perform the tests of the communication link at the different combinations of Tclk and Rclk bias settings. As a reference point for determining how long the process described above might take in practice, consider the embodiment in which the target IC die includes a DRAM storage array and the receiving IC die includes a memory controller. Also, assume that, now referring back to FIG. 1, the process described in FIGS. 4 and 5 is performed by the processor 140 executing the instructions in the BIOS 144 and using its cache memory to store the results of the comparisons. Also assume that the outgoing data symbols form a 10 kilobyte section of data to be written to and read from the DRAM. Assume that in a high performance conventional memory bus, about 6 microseconds are needed to perform a write to and read from memory of the 10 kilobytes. Also assume that to change Tclk or Rclk, about 1 microsecond is needed. Taking the example of FIG. 6, in which approximately 16 Tclk values and approximately 8 Rclk values are used, a total of 24 memory tests are performed, requiring about 144 microseconds. Add to that 24 microseconds for transitioning between the Rclk and Tclk bias values, and multiply by 10 to obtain a statistically more meaningful and larger set of data, this yields a total of approximately 1.68 milliseconds to obtain the results of the comparisons shown in FIG. 6. This is a relatively short period of time, even considering that the system would contain several DRAM dies for which the timing margin needs to be improved. Thus, it can be seen that such a technique for improving the timing margin can be performed relatively frequently during the normal operation of the system, to continuously adapt the timing margin in the main memory subsystem as conditions change while the system is operating.

Figure 8:
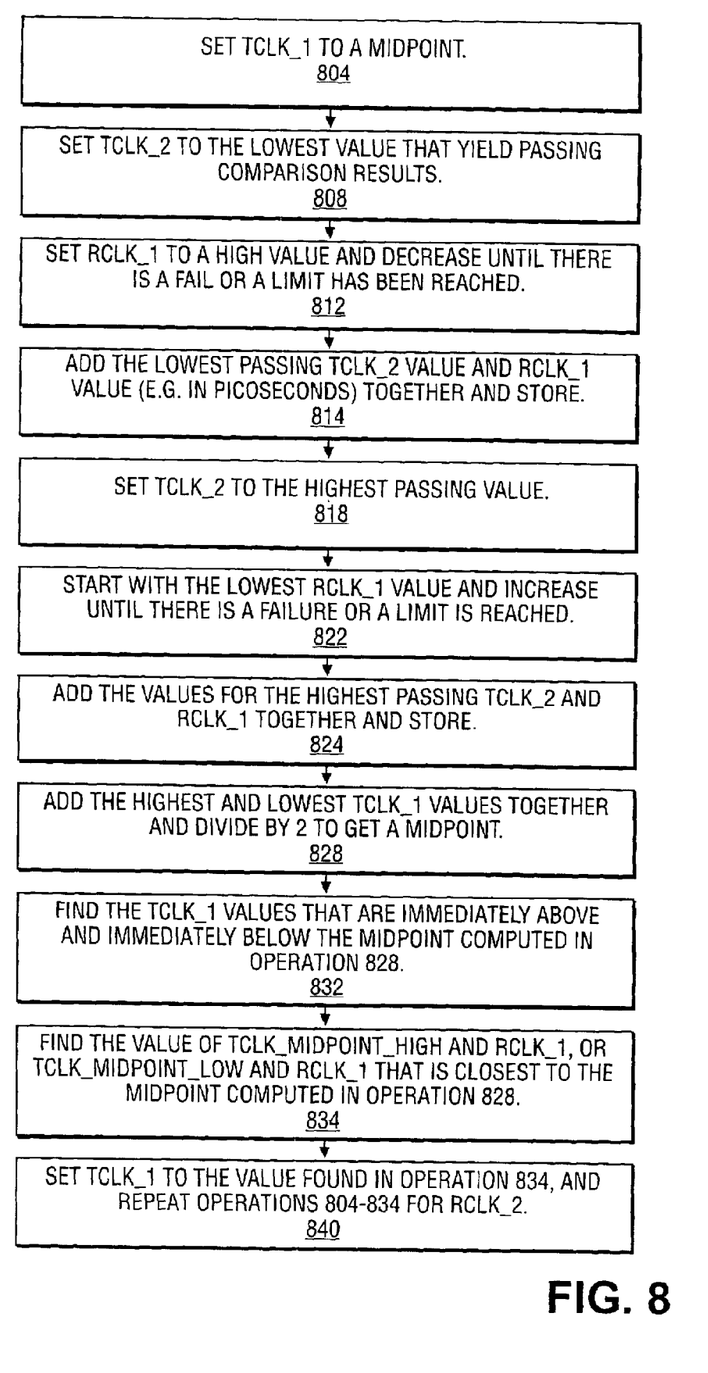
FIG. 8 shows a flow diagram of another embodiment of a process for improving timing margin.

The above described embodiments of the invention in FIGS. 1, 4, and 5 are directed to a method and an apparatus for improving timing margin by adjusting the phases of Rclk and Tclk signals in the same, target IC die. As an alternative, the software controllable technique for improving timing margin may be deployed in both the transmitting and receiving IC dies. In one such technique, it is the Rclk bias settings in both transmitting and receiving IC dies that are adjusted while the Tclk biases remain fixed. In another embodiment, it is the Tclk bias settings that are varied while the Rclk settings remain fixed. As an example of the former alternative, operation would begin with setting the Rclk bias at a first IC die, as well as setting the Rclk bias at a second IC die to, for example, the highest and lowest Rclk bias values. The second IC die would then be instructed to receive a sequence of outgoing data symbols (transmitted by the first IC die) according to the receive clock in the second IC die. Similarly, the first IC die is instructed to receive a sequence of incoming data symbols (that were transmitted by the second IC die) according to the Rclk in the first IC die. Note that the relative phase settings between Tclk and the distributed clock signals in the first and second IC dies may be set to, at least initially, the nominal value, e.g. zero picoseconds. The process then continues with comparing the outgoing symbols to the incoming symbols and, if they match, a pass is indicated for the dual Rclk bias settings. Other combinations of receive phase values in the first and second IC dies are tested in the same way, and the results of the comparisons between the outgoing and incoming symbols at each of those combinations are recorded. Finally, the relative phases of the Rclk and distributed clock signals at the first and second IC dies are set to values which are closest to yielding a balanced timing margin as determined from the results of the comparisons. FIG. 8 shows a flow diagram of such an embodiment in which the relative phase of the Rclk to distributed clock signals, i.e. the Rclk bias settings, are adjusted in different IC dies.

The flow diagram in FIG. 8 is essentially self-explanatory. It should be noted that a goal of the embodiment of FIG. 8 is to determine values for the relative phase of Tclk and distributed clock signals at the first IC die (i.e. Tclk_1) as well as the relative phase of the Rclk and distributed clock signals in the first IC die (i.e. Rclk_1) by changing Rclk_1 and Rclk_2 in the first and second IC dies, respectively. This embodiment assumes that some idea of the lowest and highest passing values of Tclk_1 and Tclk_2 are known. This is in contrast to other embodiments described above which led to the results of FIGS. 6 and 7 in which no real assumption needed to be made regarding whether any of the Rclk or Tclk values would result in a pass or fail. Thus, the process illustrated in FIG. 8 may be viewed as a refinement of the technique for improving timing margin, which may be used to obtain more accurate Rclk and Tclk bias values needed to balance the timing.

Figure 9:
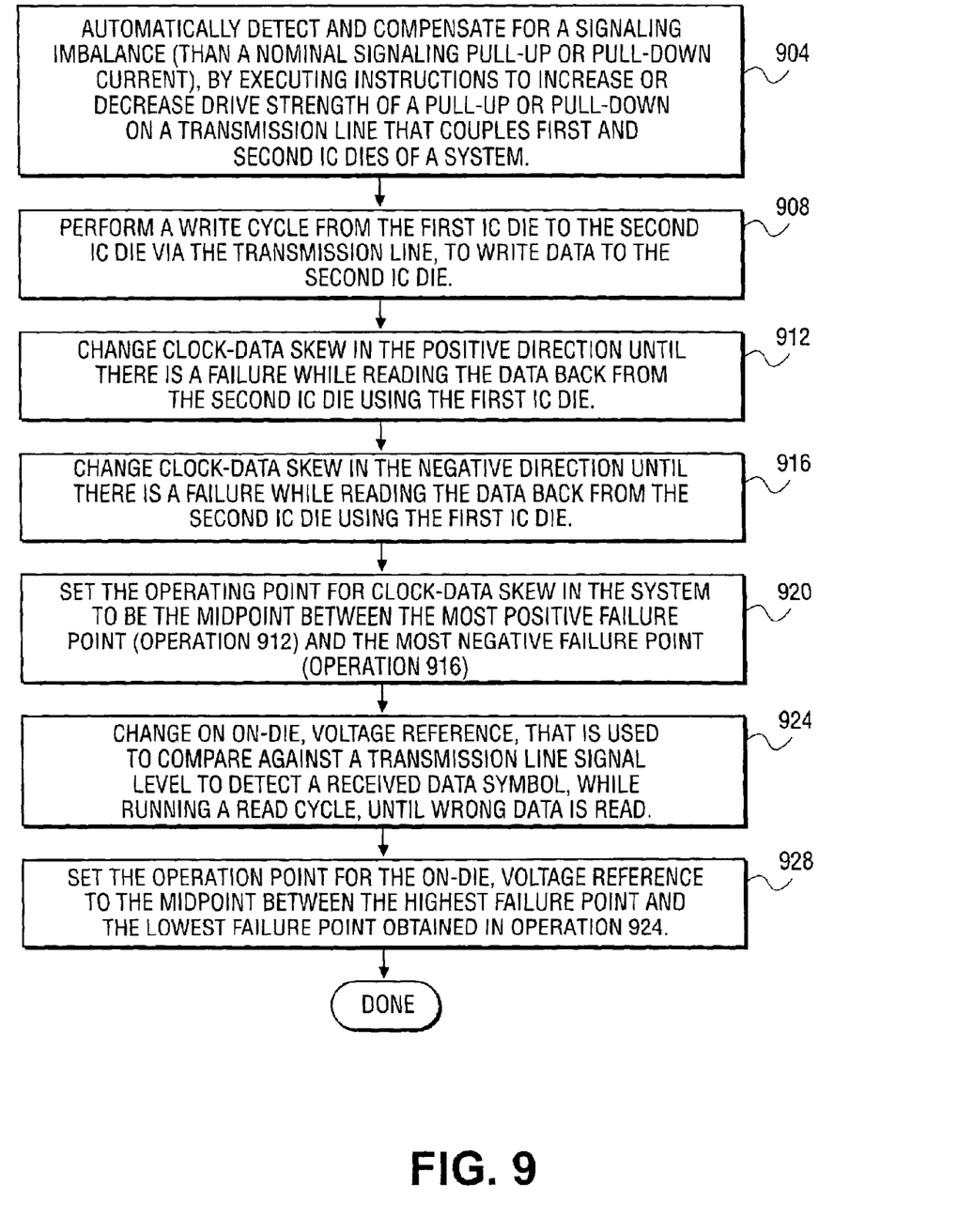
FIG. 9 depicts a flow diagram of another embodiment of a process for improving timing margin.
Figure 10:
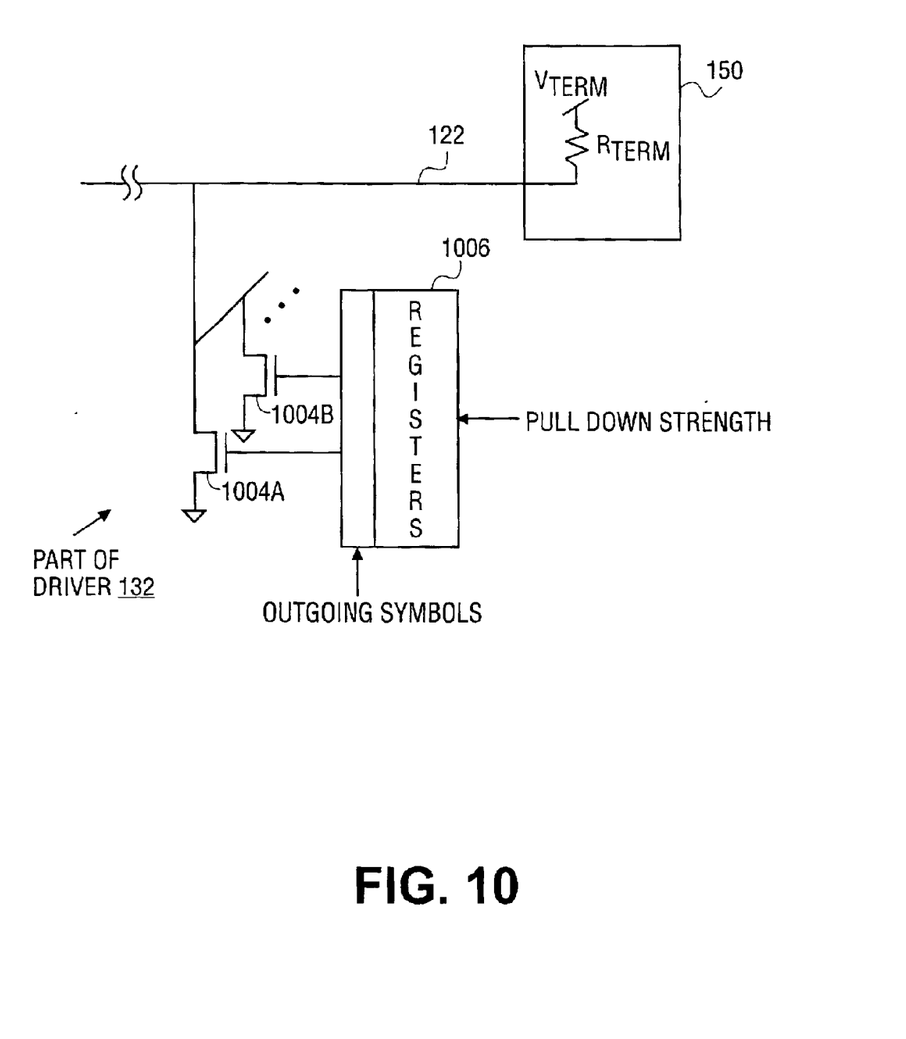
FIG. 10 illustrates a block diagram of a programmable, on-chip pull down circuit.

Referring now to FIG. 9, a flow diagram of another embodiment of a process for improving timing margin between first and second IC dies is illustrated. In this embodiment, the timing is compensated by a combination of three different techniques. The first compensation technique is to adjust the strength of a pull down or pull up transistor on the data and clock transmission lines. This is a conventional technique and can be described by the following example. Under nominal conditions, the voltage swing of a transmission line may be, for instance, from 1.0 volts to 1.8 volts. A reference voltage set at a nominal value of 1.4 volts is used to determine if a sampled value of a transmission line signal is a logic '1' or logic '0'. Timing is adjusted automatically by adjusting the strength of a, for example, n-channel metal oxide semiconductor pull down transistor. This can be done by either adding or subtracting additional transistors in parallel, to increase or decrease the drive strength of the pull down. FIG. 10 shows an exemplary, programmable pull down configuration in which n-channel field effect transistors 1004a, 1004b, . . . are coupled in parallel to pull down a data transmission line 122 according to the contents of an on-chip register 1006.

In addition to compensating by adjusting the strength of the pull down transistor, the timing margin may be improved by adjusting the clock to data skew as described above in the various embodiments. The third technique for improving timing margin is to adjust a variable reference voltage that is generated on-chip at the receiving end and is used by an analog comparator to determine the value of a received symbol. For example, referring now to FIG. 3, note how the on-die, variable reference level is set at the nominal, 50% point between a logic '1' voltage and a logic '0' voltage of the received data signal. To sample a data symbol earlier, the variable reference level is shifted to higher than the nominal point. On the other hand, to sample the data symbol later, the variable reference level can be shifted lower than the 50%, nominal point. This can be readily accomplished using a variable voltage reference that responds to the contents of a register whose contents are received from an external input to the IC die.

Having described the three different compensation techniques for improving timing margin, the process of FIG. 9 is now described for synergistically combining the three techniques. The process begins with operation 904 in which the system automatically detects and compensates for a signaling imbalance (from a nominal signaling pull up or pull down current), by executing instructions to increase or decrease the drive strength of a pull up or pull down transistor on a transmission line. In the embodiment of FIG. 1, such instructions could be stored as part of the BIOS which is executed upon startup as well as if desired during normal operation, by the processor 140. Additional registers (not shown) would be provided in the first IC die 110 to store digital values that set the transistor drive strength.

Once the signaling imbalance has been compensated for by adjusting the drive strength of the pull down or pull up transistors, the process proceeds with operation 908 in which a write cycle is performed from the first IC die to the second IC die via the transmission lines, to write data to the second IC die. The process then proceeds with operation 912 which changes the clock-data skew in the positive direction until there is a failure while reading the data back from the second IC die using the first IC die. In a similar manner, the process continues with operation 916 in which the clock data skew is changed in the negative direction, until there is a failure while reading the data back from the second IC die. These latter two operations result in a "passing window" being determined. The operating point for the clock-data skew in the system is then set to be the midpoint of this window, between the most positive failure point (operation 912) and the most negative failure point (operation 916), as operation 920. This completes the clock-data skew compensation technique.

Having completed two out of the three automatic compensation techniques as described above, the process continues with operation 924 in which the third compensation technique is used to help further improve the timing margin in the system. Thus, with the system operating under the drive strength set in operation 904 and the clock-data skew set in operation 920, the process continues with operation 924 in which an on-die voltage reference that is used to compare against a transmission line signal level to detect a received data symbol, is changed while running a read cycle. A voltage reference failure point is reached when the wrong data is read from the second IC die. The on-die voltage reference is then swept in the opposite direction until wrong data is read. Thus, a highest (largest voltage) failure point and lowest failure point are obtained for the voltage reference in operation 924. Finally, the process continues with operation 928 in which the operating point for the on-die voltage reference is set to be the midpoint between the highest and lowest failure points obtained in operation 924.

Using the combination of the three compensation techniques as described above, it is expected that timing margin will be improved significantly over the use of any one of the techniques by themselves. The order in which the three techniques were implemented, however, should be observed. Note how the strength of the pull up or pull down transistors were adjusted first, and then with the system running with these pull up/pull down settings, the clock-data skew was adjusted. Finally, with the pull up/pull down settings and the clock-data skew settings in place, the final adjustment to the voltage reference was performed.

Figure 11:
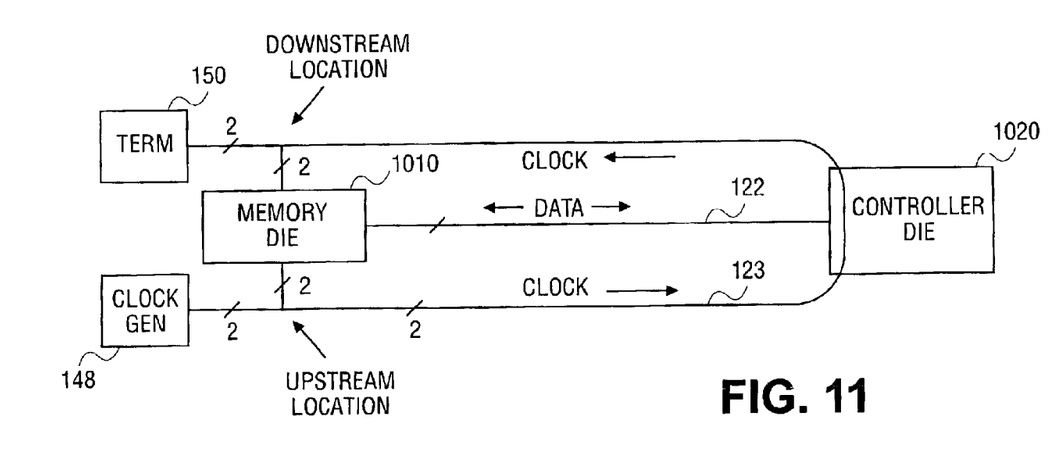
FIG. 11 shows a physical layout of the clock and data signal lines that communicatively couple a memory die and a controller die.
Figure 12:
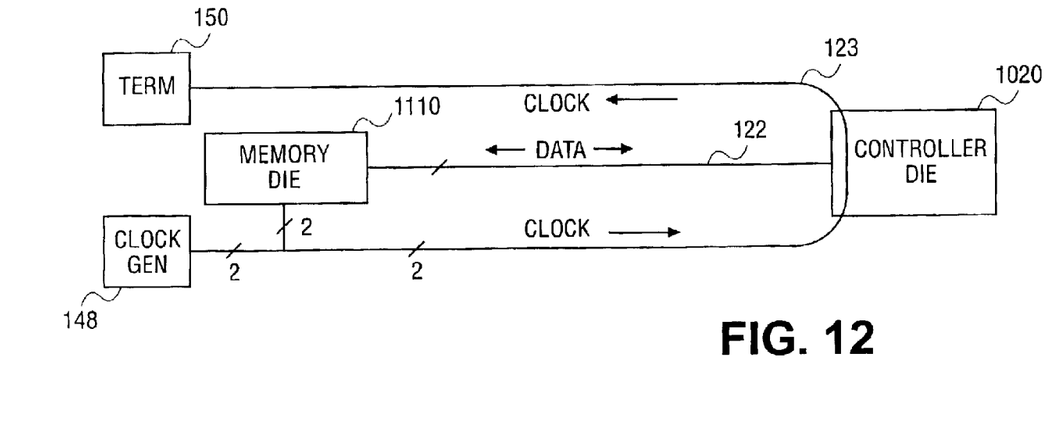
FIG. 12 illustrates another layout of the data and signal lines that communicatively couple a memory die to a controller die.

The embodiments described above refer to first and second IC dies 110 and 120 (see FIG. 1) that communicate with each other over a parallel bus that includes transmission lines 122, 123. Some practical applications of the first and second IC dies include a main memory subsystem in which the first IC die includes a DRAM storage array and/or a memory repeater and the second IC die includes a memory controller. Exemplary physical layouts of such applications are illustrated in FIGS. 11 and 12. In FIG. 11, a memory die 1010 is installed on a PWB (not shown) and communicates with a controller die 1020 over the data transmission lines 122. Note that in this embodiment, the clock transmission lines 123 originate from behind the memory die 1010 and loop through the controller die 1020 before terminating at an opposite side of the memory die 1010. The distributed clock signal that travels on the clock transmission lines 123 originates from a clock signal generator die 148 and terminates at a termination circuit 150. Such a scheme for generating the distributed clock signal is also shown in FIG. 1. A practical example of the clock signal generator die 148 is the one found in the Direct Rambus Clock Generator (i.e. DRCG) device offered by Rambus, Inc. of Mountainview, Calif.

Regarding the embodiment of FIG. 12, a difference between this figure and the embodiment of FIG. 11 is that there is not two but rather one connection point between the clock transmission lines 123 and a memory die 1110. Thus, in this embodiment, the distributed clock signal is derived not from separate upstream and downstream locations (as in FIG. 1) but rather only from a single, upstream location as shown. The distributed clock signal that will be used to derive the Rclk signal can be emulated based on the clock signal obtained from the upstream point, by adding a time delay that represents an estimate of the length of time needed for the clock signal to propagate from the controller die 1020 back to a point that would have been a second connection to a downstream point of the clock transmission line 123. There may be other techniques for obtaining the distributed clock signal in each IC die that can be developed by those of ordinary skill in the art.

To summarize, various embodiments of a method and apparatus for increasing timing margin under control of processor executable instructions have been described. In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
   allowing a processor to execute instructions for improving a timing margin in a first integrated circuit (IC) die under test, wherein the execution
   (a) instructs the first IC die to set a relative phase of receive and reference clock signals at the first IC die, from a plurality of discrete, receive phase values,
   (b) instructs the first IC die to set a relative phase of transmit and reference clock signals at the first IC die, from a plurality of discrete, transmit phase values,
   (c) instructs the first IC die to drive a sequence of outgoing data symbols according to the transmit clock signal and receive a sequence of incoming data symbols according to the receive clock signal, at the relative phase settings of (a) and (b), and records one of a pass indication and a fail indication for the relative phase settings, and then
   (d) repeats (a)–(c) for other combinations of said plurality of transmit and receive phase values, and then
   (e) sets the relative phases, to values which are closest to yielding a balanced timing margin as determined from recorded pass/fail indication.

2. The method of claim 1 wherein the plurality of discrete, transmit phase values are predetermined positive and negative clock bias numbers with respect to a zero clock bias.

3. The method of claim 2 wherein the zero clock bias represents a delay, immediately following a predefined transition of reference clock signal, that is one of approximately ¼ cycle and approximately ¾ cycle of the reference clock signal.

4. The method of claim 2 further comprising:
   allowing the processor to execute further instructions to repeat (a)–(c) for all other combinations of said plurality of transmit and receive phase values, prior to (e).

5. An article of manufacture comprising:
   a machine-readable medium having instructions stored therein which, when executed by a processor, control a timing margin in an electronic system having first and second integrated circuit (IC) dies coupled to each other, the first IC die to drive a transmission line signal with a sequence of outgoing data symbols according to a transmit clock signal which is synchronized to a first reference clock signal, the first IC die to sample a transmission line signal to obtain a sequence of incoming data symbols according to a receive clock signal which is synchronized to a second reference clock signal, wherein execution of the instructions
   (a) sets a relative phase of the receive and the second reference clock signals, from a plurality of discrete, receive phase values,
   (b) sets a relative phase of the transmit and the first reference clock signals, from a plurality of discrete, transmit phase values,
   (c) instructs the first IC die to drive the sequence of outgoing data symbols and receive the sequence of incoming data symbols, at the relative phase settings of (a) and (b), compares the outgoing symbols to the incoming data symbols and records a result of the comparison, and then
   (d) repeats (a)–(c) for other combinations of said plurality of discrete, transmit phase values and discrete, receive phase values, and then
   (e) sets the relative phases, as in (a) and (b), to a pair of values, from said plurality of discrete, transmit and receive phase values, which cause data to be launched or sampled in the middle of a permissible timing window as determined from the results of the comparisons.

6. The article of manufacture of claim 5 wherein the machine-readable medium includes further instructions which, when executed by the processor, store the results of the comparisons in an array of variables each to be assigned one of a pass value and a fail value, wherein a pass means that the sequences of incoming and outgoing symbols substantially match and a fail means that they do not, and wherein each variable refers to the result of a comparison for a different pair of said plurality of discrete, receive and transmit phase values.

7. The article of manufacture of claim 6 wherein the machine-readable medium includes further instructions which, when executed by the processor, determine the largest timing margin by computing an average of the highest and lowest passing, discrete, transmit phase values, and an average of the highest and lowest passing, discrete, receive phase values in the array.

8. An electronic system comprising:

first and second integrated circuit (IC) dies coupled to each other via one or more data transmission lines, and a processor coupled to access the first and second IC dies, the first IC die to drive a transmission line signal, in one of the transmission lines, with a sequence of outgoing data symbols according to a transmit clock signal, the first IC die to derive the transmit clock signal from a distributed clock signal, which is distributed to the first and second IC dies, the first IC die to repeatedly sample a transmission line signal, from one of the transmission lines, to obtain a sequence of incoming data symbols according to a receive clock signal, the first IC die to derive the receive clock signal from the distributed clock signal, wherein the first IC die is to adjust (1) a relative phase of the transmit and distributed clock signals and (2) a relative phase of the receive and distributed clock signals, according to values stored in the first IC die and determined by the processor executing a program that evaluates data transfers between the first and second IC dies to improve timing margin.

9. The electronic system of claim 8 wherein the transmission line includes one or more parallel traces formed in a printed wiring board on which the first and second IC dies are installed.

10. The electronic system of claim 8 further comprising a clock signal generator coupled to provide the first and second IC dies with the distributed clock signal via a pair of parallel traces formed in a printed wiring board and to which an external clock input of the first die is connected.

11. The electronic system of claim 10 further comprising a termination circuit, wherein the clock signal generator is coupled to one end of the pair of traces and the termination circuit is coupled to another end of the pair of traces, and wherein the pair of traces is looped through the second IC die.

12. The electronic system of claim 11 wherein the distributed clock signal is provided to the driver timing circuitry and to the receiver timing circuitry from upstream and downstream locations, respectively, on the pair of traces.

13. The electronic system of claim 8 wherein the receive delay is one of approximately zero cycle and approximately ½ cycle of the distributed clock signal, and the transmit delay is one of approximately ¼ cycle and approximately ¾ cycle of the distributed clock signal.

14. The electronic system of claim 8 wherein the first IC die includes a dynamic random access memory storage array and the second IC die includes a memory controller.

15. The electronic system of claim 8 wherein the first IC die includes a memory repeater and the second IC die includes a memory controller.

16. A method comprising:

allowing a processor to execute instructions for improving a timing margin in first and second integrated circuit (IC) dies, wherein the execution (a) sets a relative phase of receive and distributed clock signals at the first IC die, from a plurality of discrete, first receive phase values, (b) sets a relative phase of receive and distributed clock signals at the second IC die, from a plurality of discrete, second receive phase values, (c) instructs the second IC die to receive a sequence of outgoing data symbols according to the receive clock and the first IC die to receive a sequence of incoming data symbols according to the receive clock, at the relative phase settings of (b) and (a), respectively, and records one of a pass indication and a fail indication for the relative phase settings, and then (d) repeats (a)–(c) for other combinations of said plurality of first and second receive phase values, and then (e) sets the relative phases, as in (a) and (b), to values which are closest to yielding a balanced timing margin as determined from recorded pass/fail indications.

17. The method of claim 16 wherein the plurality of discrete, first and second receive phase values are predetermined positive and negative clock bias numbers with respect to a zero clock bias.

18. The method of claim 17 wherein the zero clock bias represents a delay, immediately following a predefined transition of the distributed clock signal, that is one of approximately zero cycle and approximately ½ cycle of the distributed clock signal.

19. A method comprising:

allowing a processor to execute instructions for improving a timing margin in first and second integrated circuit (IC) dies, wherein the execution (a) sets a relative phase of transmit and reference clock signals at the first IC die, from a plurality of discrete, first transmit phase values, (b) sets a relative phase of transmit and reference clock signals at the second IC die, from a plurality of discrete, second transmit phase values, (c) instructs the first IC die to drive a sequence of outgoing data symbols according to the transmit clock and the second IC die to drive a sequence of incoming data symbols according to the transmit clock, at the relative phase settings of (a) and (b), respectively, and records one of a pass indication and a fail indication for the relative phase settings, and then (d) repeats (a)–(c) for other combinations of said plurality of first and second transmit phase values, and then (e) sets the relative phases, as in (a) and (b), to values which cause data to be launched or sampled in the middle of a permissible timing window as determined from recorded pass/fail indications.

20. The method of claim 19 wherein the plurality of discrete, first and second transmit phase values are predetermined positive and negative clock bias numbers with respect to a zero clock bias.

21. The method of claim 20 wherein the zero clock bias represents a delay, immediately following a predefined transition of a reference clock signal, that is one of approximately ¼ cycle and approximately ¾ cycle of the reference clock signal.

* * * * *